United States Patent
Nicot

(12)
(10) Patent No.: US 6,176,622 B1
(45) Date of Patent: Jan. 23, 2001

(54) ATTACHMENT DEVICE FOR A DATA SENSOR FOR A BEARING

(75) Inventor: Christophe Nicot, Epagny (FR)

(73) Assignee: The Torrington Company, Torrington, CT (US)

(*) Notice: Under 35 U.S.C. 154(b), the term of this patent shall be extended for 0 days.

(21) Appl. No.: 09/289,315

(22) Filed: Apr. 9, 1999

(30) Foreign Application Priority Data

Apr. 10, 1998 (FR) .................................................. 98 04539

(51) Int. Cl.⁷ ............................... F16C 32/00; G01P 3/48
(52) U.S. Cl. ..................................... 384/448; 324/207.25
(58) Field of Search ........................... 384/448; 324/173, 324/174, 207.25

(56) References Cited

U.S. PATENT DOCUMENTS

| 5,451,869 | * | 9/1995 | Alff ....................................... 324/173 |
| 5,550,467 | | 8/1996 | Goossens ............................. 324/173 |
| 5,567,058 | * | 10/1996 | Morita et al. ........................ 384/448 |
| 5,611,545 | | 3/1997 | Nicot ...................................... 277/2 |
| 5,640,087 | * | 6/1997 | Alff ....................................... 324/173 |
| 5,642,042 | * | 6/1997 | Goossens et al. .................... 324/173 |
| 5,756,894 | * | 5/1998 | Paolo et al. ...................... 384/448 X |
| 5,762,425 | * | 6/1998 | Ouchi ................................... 384/448 |
| 5,803,419 | * | 9/1998 | Nicot .............................. 324/173 X |
| 5,852,361 | * | 12/1998 | Ouchi et al. ......................... 324/174 |
| 5,975,761 | * | 11/1999 | Ouchi et al. ......................... 384/448 |

FOREIGN PATENT DOCUMENTS 0 767 385 A1    4/1997 (EP) .

* cited by examiner

Primary Examiner—Thomas R. Hannon
(74) Attorney, Agent, or Firm—John C. Bigler

(57) ABSTRACT

Attachment device for a data sensor for a bearing on which an encoding element is connected to a turning race that is separated by rolling elements from a fixed race, the sensor being mounted on a support that is immobile relative to the fixed race. The support has at least a first element and a second element joined together. The first element immobilizes the support relative to the fixed race, and the second element integrates functions of guiding and immobilizing the sensor on the support.

14 Claims, 6 Drawing Sheets

ATTACHMENT DEVICE FOR A DATA SENSOR FOR A BEARING

BACKGROUND OF THE INVENTION

This invention relates generally to a device for attaching a data sensor and, more particularly, to a device for attaching a fixed, non-contacting data sensor opposite a bearing equipped with an encoding element capable of being read by the sensor.

Publications FR 2 703 740, FR 2 730 283, and FR 2 740 186 describe different supports for a fixed sensor in the immediate vicinity of a fixed race of a bearing. Such supports are generally annular and include a guideway on which the sensor is mounted and held by an elastic immobilization means.

As can be seen in various documents, the described bearing assemblies involve a variety of designs for the data sensor supports, which may be attached to one or another of the bearing races, depending on whether the turning race is the outer or the inner race. The supports may also be clamped between the fixed race and a bearing seat mounting element or may even be adapted to an armature on the bearing seal.

However, such sensor supports require the design and specification of special tooling in order to make a different support for each possible type of application, which results in significant cost increases. Additionally, there is a need for a device that provides an easy immobilization of the sensor on the support, a device which is also simple and economical to make.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an attachment device for mounting a sensor in proximity to a bearing on which an encoding element is connected to a rotating race of the bearing that is separated by rolling elements from a fixed race of the bearing. The attachment device comprises a support that is adapted for mounting in proximity to the bearing so to be immobile relative to the fixed race. The support comprises at least a first element and a second element joined together. The first element is configured to immobilize the support relative to the fixed race, and the second element is configured to integrate functions of guiding and immobilizing the sensor on the support.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
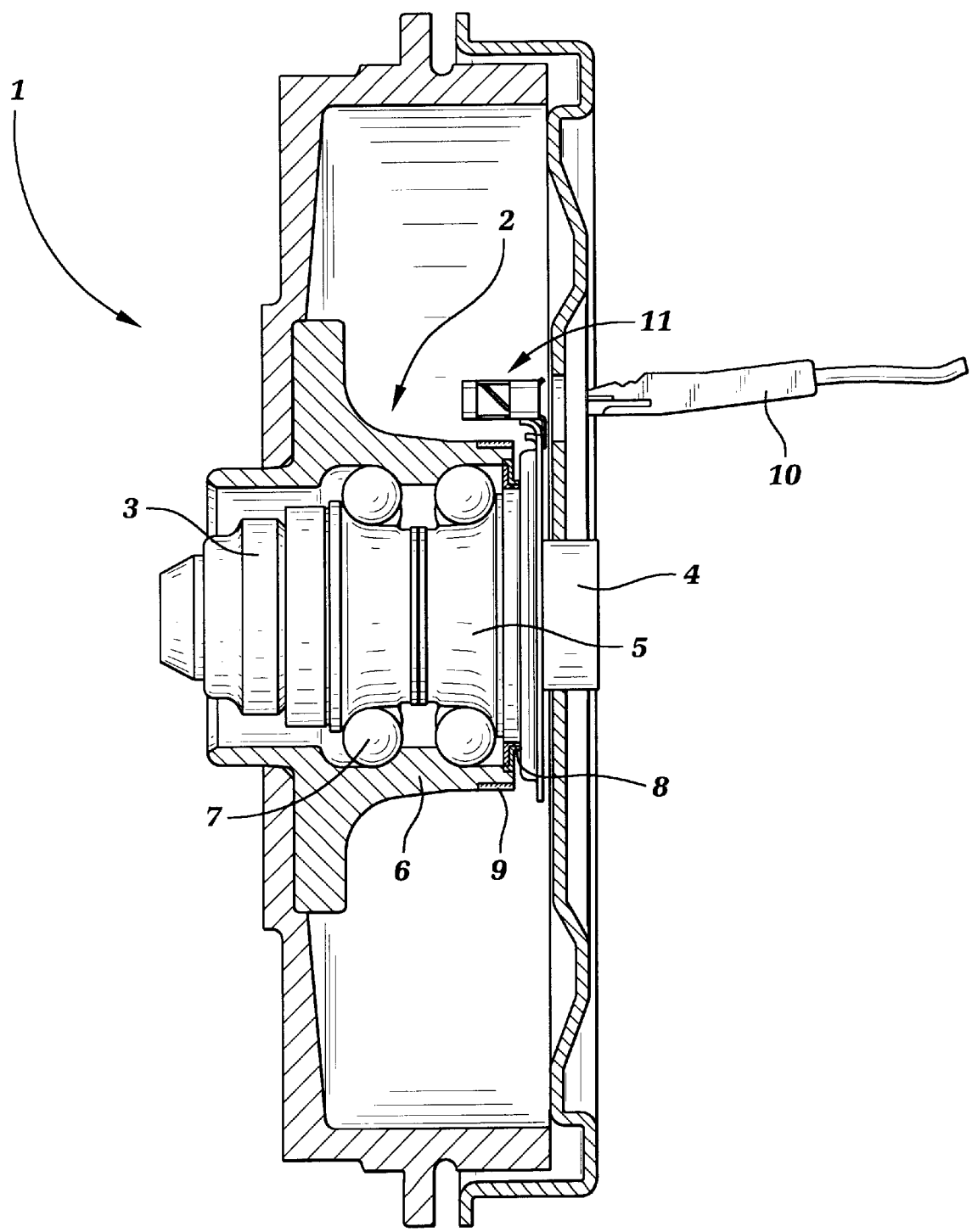
FIG. 1 is a cross sectional view of a support illustrating an embodiment of the present invention, mounted on a hub assembly of an automobile drive wheel.

FIG. 1 illustrates wheel hub assembly 1 in which roller bearing 2 is attached by securing it, using nut 3, to the shoulder of steering knuckle 4. Roller bearing 2 may be a standard size and consists of fixed race 5 and turning race 6, separated by rolling elements 7. It is kept watertight by means of seal 8. Turning race 6 is equipped with magnetic encoding device 9 mounted, for example, by bonding, whose rotation is detected by fixed sensor 10 held at a given air gap from the surface of encoding device 9 by support 11 mounted on fixed race 5.

Figure 2:
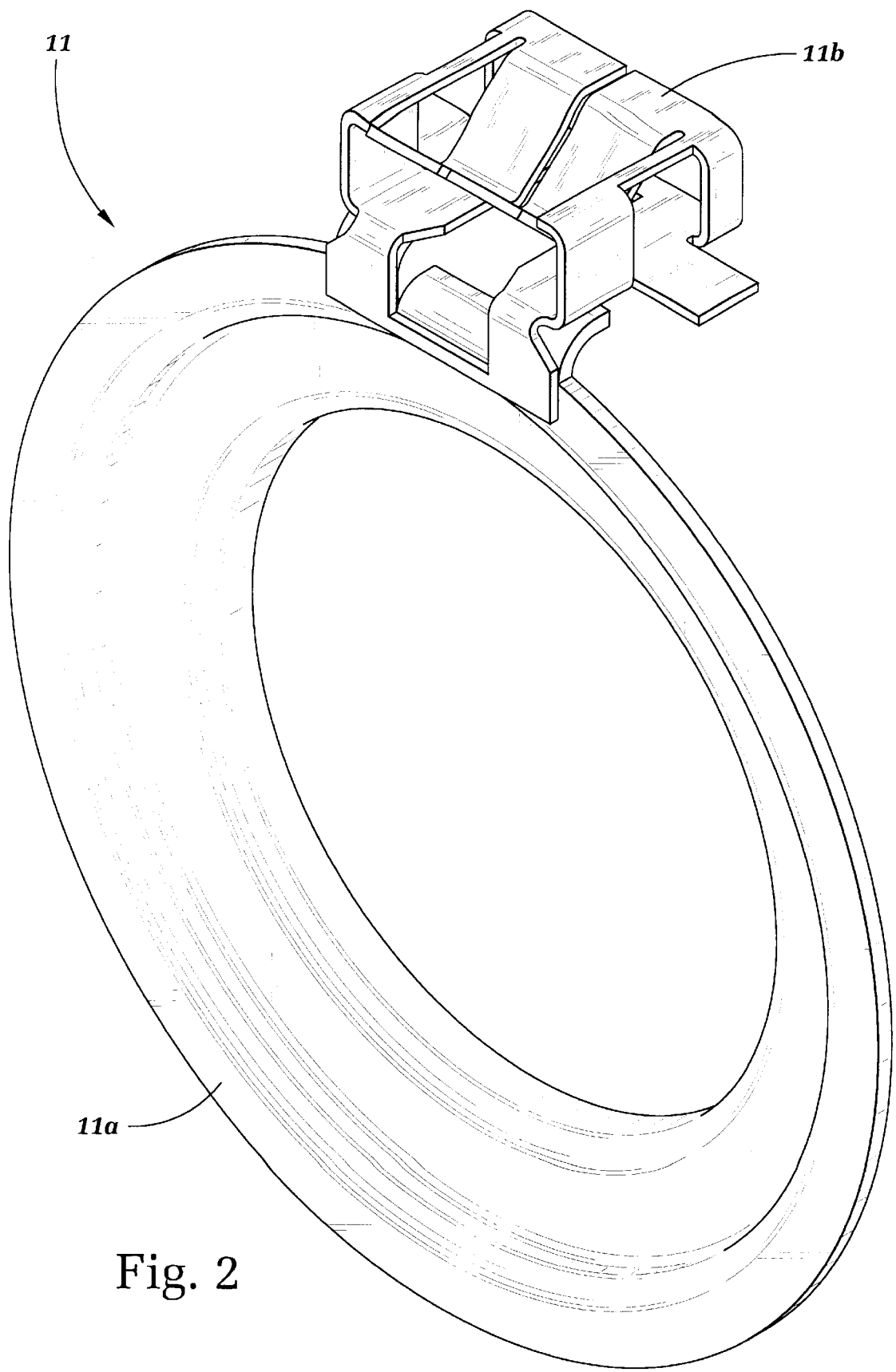
FIG. 2 is a perspective view of the support of FIG. 1, illustrating an embodiment of the present invention permitting axial mounting of a sensor.

Support 11, illustrated in FIG. 2, consists of a first element 11a and a second element 11b, rigidly attached to one another by a process such as spot welding, for example. Of course, in alternative embodiments, first and second elements 11a and 11b may also be joined together with an adhesive or by mechanical means such as clips or rivets.

Figure 3:
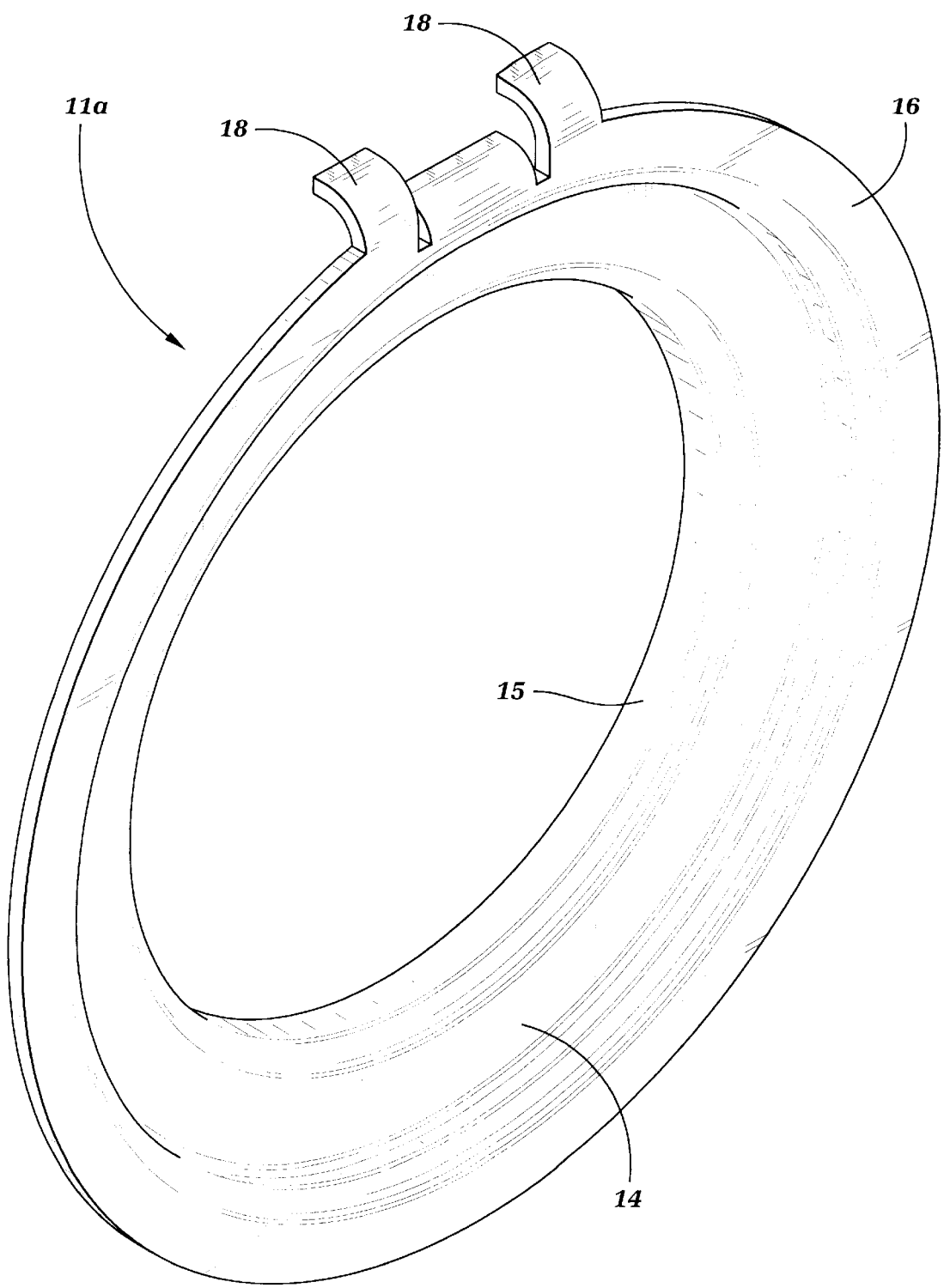
FIG. 3 is a perspective view of a first support element of the support of FIG. 1.

First element 11a, illustrated separately in FIG. 3, comprises a generally annular central disk 14, equipped with collar 15 at its center. Preferably, central disk 14 has an area whose surface configuration is capable of fitting together with a rim on seal 8 when support 11 is banded onto fixed race 5, thereby ensuring dynamic sealing of the bearing. First element 11a also includes peripheral annular part 16 that extends radially outward on a plane shifted from that of central disk 14, and is equipped with tabs 18 designed to be welded or otherwise attached to second element 11b.

Figure 4:
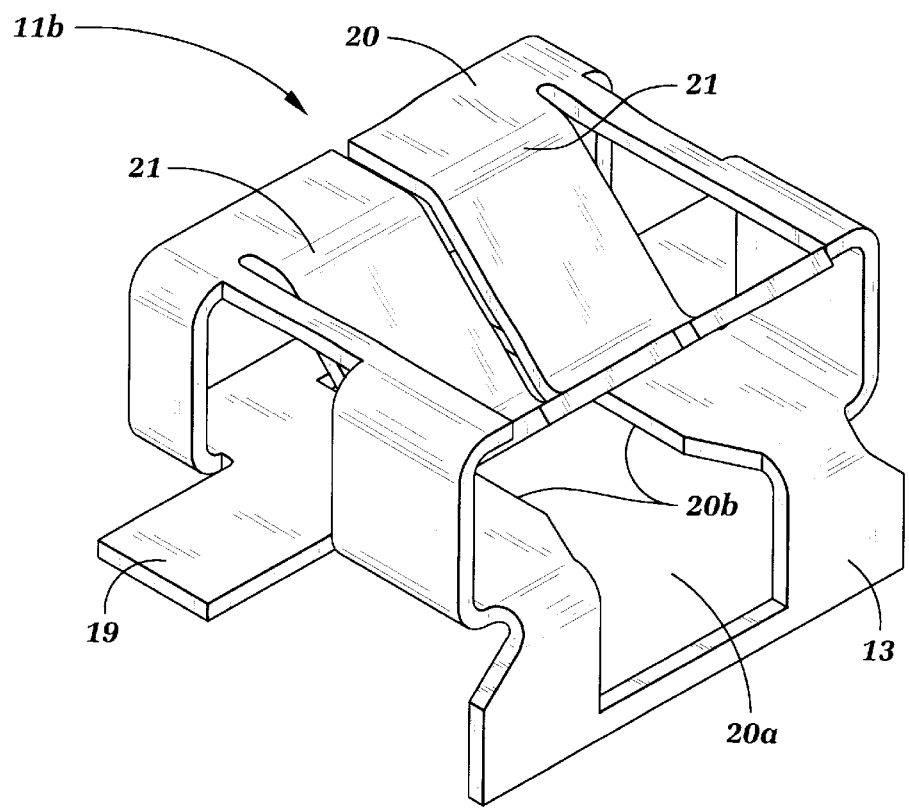
FIG. 4 is a perspective view of a second support element of the support of FIG. 1.
Figure 5:
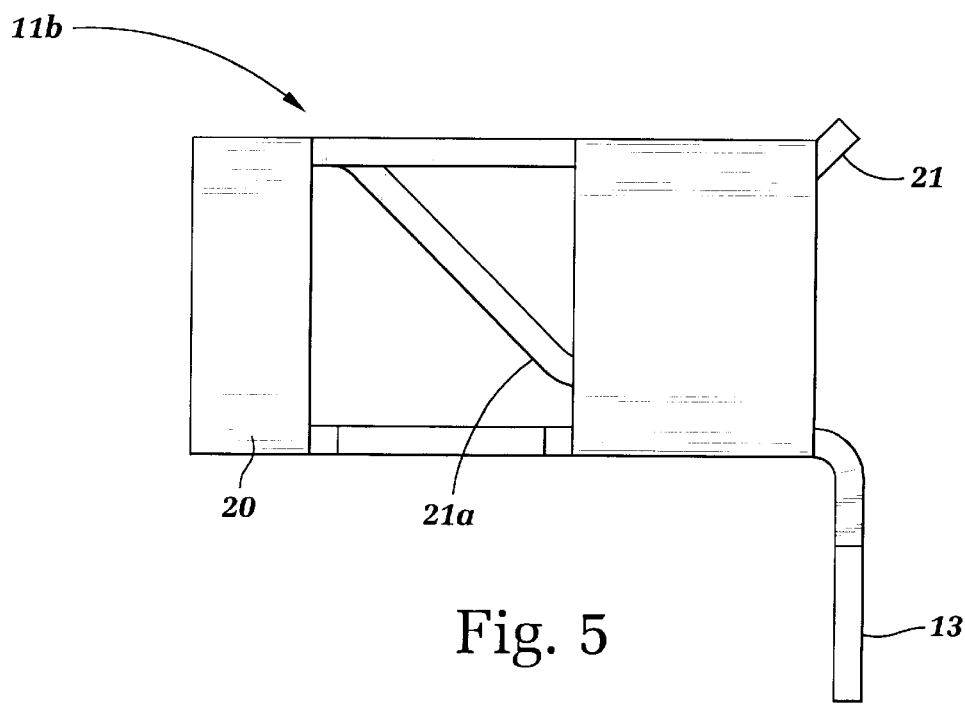
FIG. 5 is a side view of the second element of FIG. 4.

Second element 11b, illustrated separately in FIGS. 4 and 5, consists of armature 20, approximately parallelepipedal in form, designed to enclose sensor 10. This armature 20 includes, on one face, window 20a through the free end of which sensor 10 is inserted, and lateral edges 20b which act as guide rails that match grooves cut along lateral edges of sensor 10. Armature 20 also includes, on the face opposite that of window 20a, two flexible tabs 21 equipped with boss 21a that extend towards the interior of armature 20 where they fit into a cavity provided in sensor 10 and serve to fix it in position. In order to facilitate insertion of sensor 10 into armature 20, the end of flexible tabs 21 is curved outward, and the end of guide rails 20b is beveled so as to guide sensor 10 along the axis of armature 20.

Armature 20 is held rigid by small bridge 13 that extends from the end of guide rails 20b, perpendicular to the edge of armature 20, and is designed to be welded or otherwise attached to tabs 18 on first element 11a. Armature 20 also includes side tabs 19 positioned on a plane perpendicular to the plane of small bridge 13, and permitting second element 11b to be attached to first element 11a in different directions in the embodiment variants of the invention.

As illustrated in FIG. 1, support 11, obtained by assembling first and second elements 11a and 11b together, permits sensor 10 to be kept in precise position relative to encoding device 9 by providing a first element 11a with high rigidity, and also optimizes the ease of insertion and securing of sensor 10 through support 11 by providing second element 11b equipped with good flexibility. Thus, first element 11a may be advantageously made at low cost by stamping it from a steel plate with relatively low mechanical properties, the connecting flange between central disk 14 and annular part 16 providing great rigidity to first element 11a. Second element 11b may be advantageously obtained by the process of cutting and folding a steel plate whose thickness and mechanical properties are suited to obtaining a good spring-like effect from tabs 21.

Figure 6:
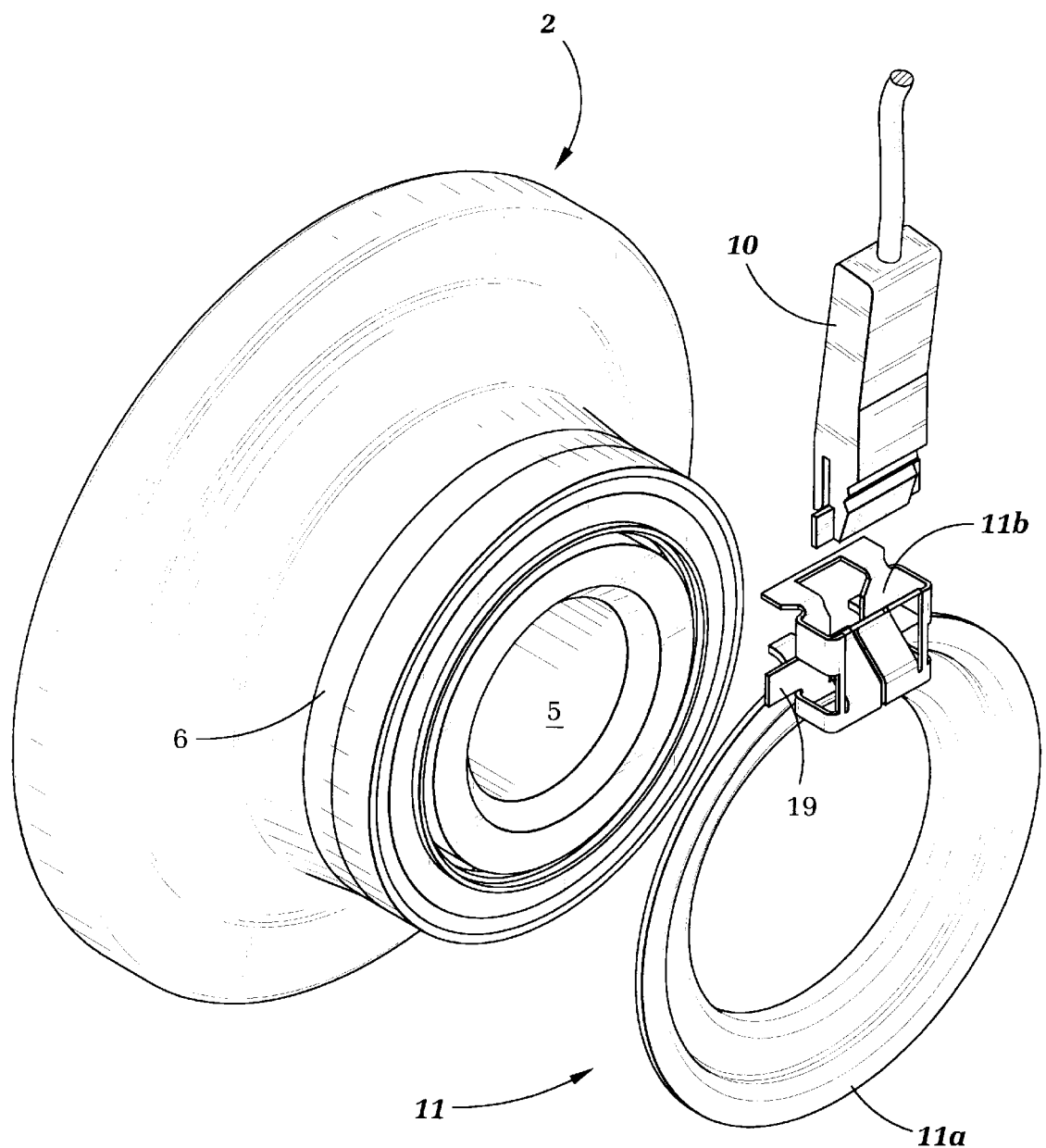
FIG. 6 is a perspective view of a support illustrating a second embodiment of the present invention permitting radial mounting of a sensor, mounted on portions of a hub assembly of an automobile wheel.

By maintaining the same second element 11b from FIG. 4 and therefore the same standard size sensor 10, for example, the attachment device according to the invention also makes it possible to make different supports 11 adapted for radial or axial mounting of sensor 10. Thus, as shown in FIG. 6, illustrating a second embodiment of the attachment device according to the present invention, second element 11b may also be mounted perpendicularly with respect to first element 11a by means of side tabs 19 so as to permit radial mounting of sensor 10.

Figure 7:
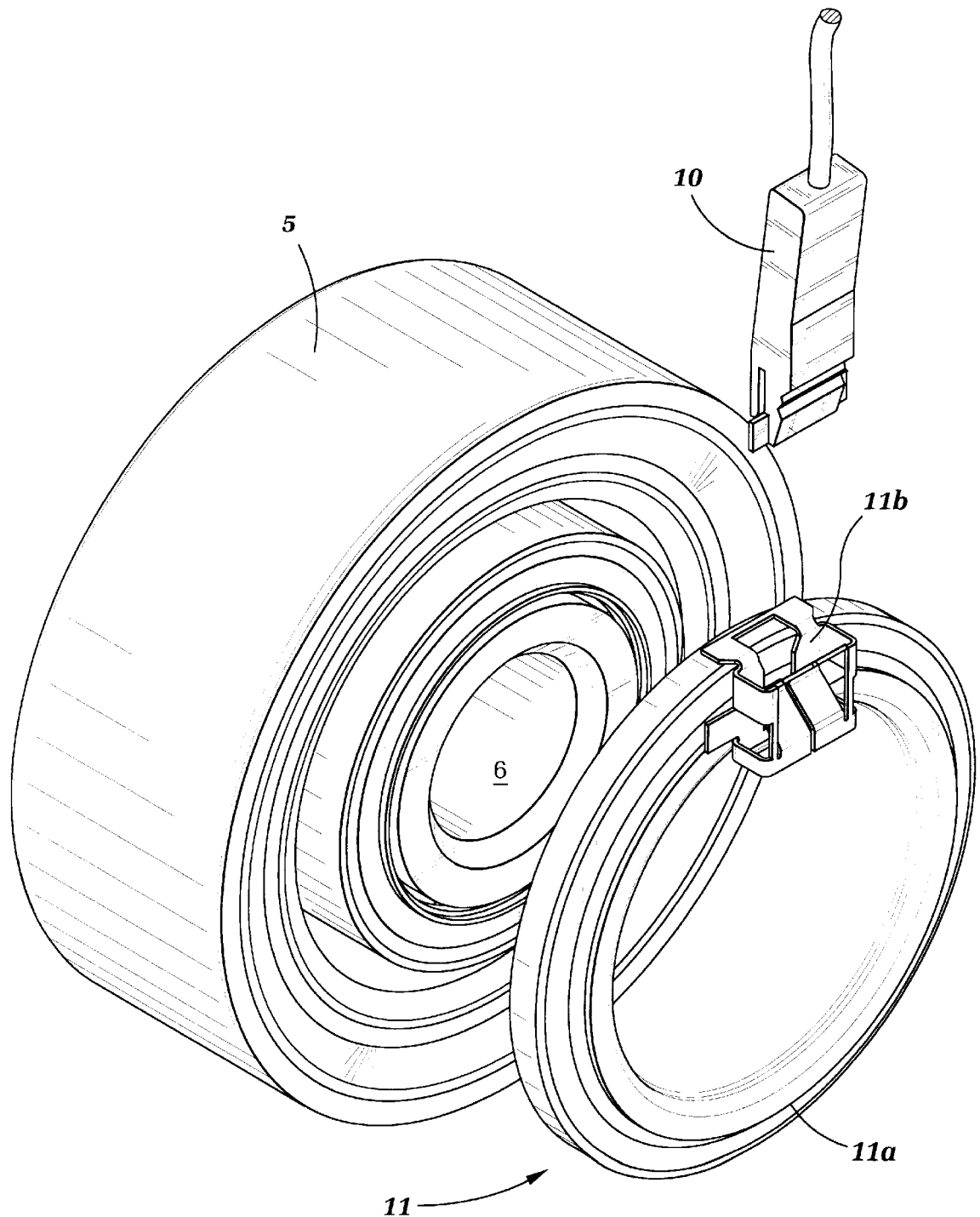
FIG. 7 is a perspective view of a support illustrating a third embodiment of the present invention permitting mounting of the support over a bearing with a fixed outer race.

In a third embodiment of the attachment device according to the present invention, shown in FIG. 7, the same second element 11b may also be mounted on first element 11a which is adapted so as to be mounted on outer fixed race 5 of a bearing. The attachment device according to the invention therefore permits a quick and inexpensive adaptation of the support to different needs relating to various assemblies. In addition, by making the sensor support on the basis of a first element that immobilizes the support on the fixed race and a second element that guides and immobilizes the sensor, it is possible to optimize the thickness and choice of materials depending on the specific needs of each of the elements, and hence to reduce the cost.

The invention is, of course, in no way limited to the illustrated and described embodiment, which is given by way of example only. In particular, the sensor support may be attached to any element, immobile relative to the fixed race and located near the sensor.

Having described the invention, what is claimed is:

1. An attachment device for mounting a data sensor in proximity to a bearing on which an encoding element is connected to a rotating race of the bearing that is separated by rolling elements from a fixed race of the bearing, the attachment device comprising:

a support that is adapted for mounting in proximity to the bearing so to be immobile relative to the fixed race, wherein the support comprises at least a first element and a second element joined together, the first element configured to immobilize the support relative to the fixed race, and the second element configured to integrate functions of guiding and immobilizing the sensor on the support.

2. The attachment device according to claim 1, wherein the first element is mounted on the fixed race.

3. The attachment device according to claim 1, wherein the second element includes an armature that is approximately parallelepipedal in form, which is configured to surround the sensor, the armature having an inlet containing guiding edges that cooperate with the sensor so as to guide the sensor along the alignment of the armature and thus facilitate insertion of the sensor.

4. The attachment device according to claim 1, wherein the second element contains a mounting guideway for the sensor and flexible tabs that cooperate with the sensor to fix it in position.

5. The attachment device according to claim 1, wherein the second element comprises several attachment elements that permit assembly of the second element with various alternative first elements.

6. The attachment device according to claim 1, wherein the second element comprises several attachment elements that permit joining of the second element to the first element in a variety of orientations so as to permit multiple mounting orientations of the sensor with respect to the encoder and the rotating race.

7. The attachment device according to claim 1, wherein the first element includes an annular disk equipped with a collar that fits onto the fixed race.

8. The attachment device according to claim 7, wherein the annular disk comprises a deflector that works with a bearing seal mounted on the bearing, the annular disk and the collar having at least one surface that is capable of fitting together with the rim of the seal to form a dynamic seal.

9. The attachment device according to claim 1, wherein the first element and the second element are made of different materials.

10. The attachment device according to claim 9, wherein the first element and the second element are made of different steel alloys.

11. The attachment device according to claim 9, wherein the first element and the second element are made of different materials, one being made of metal and the other being made of a polymer.

12. The attachment device according to claim 9, wherein the first element and the second element are made of different steel alloys.

13. The attachment device according to claim 1, wherein the first element and the second element are made from metal having different thicknesses.

14. Attachment device according to claim 1, wherein the first and second elements are welded together.

* * * * *